(No Model.)
E. HOGBIN.
SECTIONAL HORSESHOE.
No. 519,453. Patented May 8, 1894.
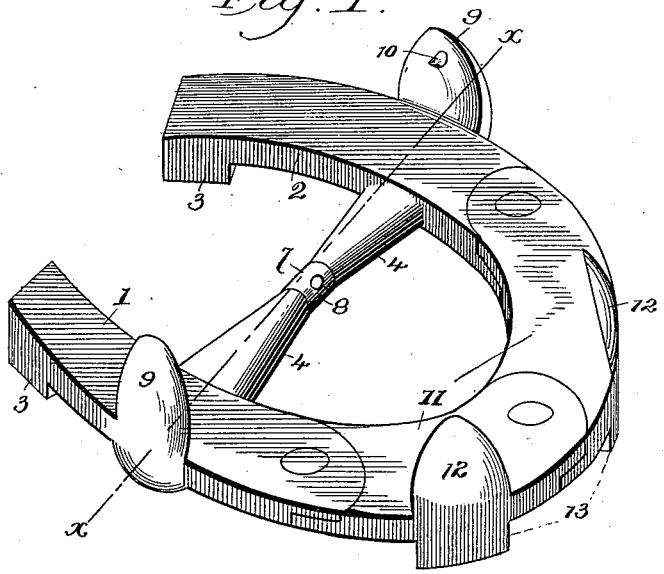
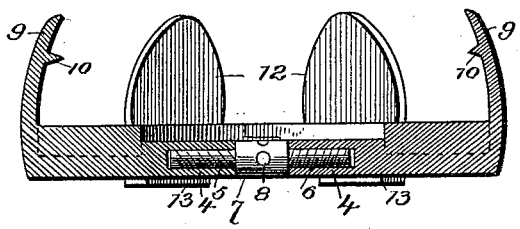
Witnesses
J. W. Reynolds
Chas. S. Hyer
Inventor:
Elmer Hogbin
By John Wedderburn
Atty.
THE NATIONAL LITHOGRAPHING COMPANY,
WASHINGTON, D. C.

UNITED STATES PATENT OFFICE.

ELMER HOGBIN, OF CAMDEN, NEW JERSEY.

SECTIONAL HORSESHOE.

SPECIFICATION forming part of Letters Patent No. 519,453, dated May 8, 1894.

Application filed February 27, 1894. Serial No. 501,671. (No model.)

*To all whom it may concern:*

Be it known that I, ELMER HOGBIN, a citizen of the United States, residing at Camden, in the county of Camden and State of New Jersey, have invented certain new and useful Improvements in Horseshoes; and I do hereby declare the following to be a full, clear, and exact description of the invention, such as will enable others skilled in the art to which it appertains to make and use the same.

This invention relates to horse shoes and has for its object to provide a device of the character set forth, wherein the use of nails is dispensed with and which can be readily adjusted to any size of hoof and secured in its adjusted position.

With that and other objects in view, the invention consists of the construction and arrangement of the several parts which will be more fully hereinafter described and claimed.

In the drawings—Figure 1 is a perspective view of a horseshoe embodying the invention. Fig. 2 is a transverse vertical section on the line $x-x$ of Fig. 1.

Similar numerals of reference are employed to indicate corresponding parts in both the views.

Referring to the drawings, the numerals 1 and 2 designate respectively, rear side sections having depending heel calks 3, and integrally formed with the opposite inner edges thereof are conical hollow arms, 4, which are screw-threaded in reverse directions and engaged by right and left screws 5 and 6, continuous with and forming an integral part of a central cylindrical head 7, having openings 8 therein for engagement by a tool or key. The head 7 is of such diameter that the inner opposing portions of sleeves 4 when brought near together by the action of the head 7 make therewith a substantially smooth or unbroken surface and thereby avoid projections. On the outer edges of each of the sections 1 and 2 are upwardly projecting, inwardly extending ears 9 having inner concaved sides to conform to the shape of the hoof and preferably provided with spurs 10, as shown in Fig. 2, to enter the hoof in order to prevent slipping. To the sections 1 and 2 are pivotally connected front sections 11 by scarfed or break joints, the said front sections being of themselves attached to each other by a similar joint. Each of the front sections 11 is also provided with an upwardly projecting, inwardly extending ear 12 similar in construction to the ears 9. The said front ears 12 are not provided with the spurs on their inner surfaces but are concaved and being at such an angle as to conform to the front lower portion of a hoof and continuing therefrom downwardly are double toe calks 13.

In applying the shoe the head 7 is loosened to separate the side sections 1 and 2, which move in their pivots together with the front sections 11 and thereby permit the shoe to be applied over a hoof, and is afterward adjusted to the hoof by turning the head 7 in such a direction as to draw the arms 4 inwardly and simultaneously therewith contract the several sections of the shoe to bring the ears 9 and 12 firmly against the hoof. This will prevent the shoe from becoming loose or dropping off and the use of nails or other means of adjustment is entirely avoided.

The shoe may be readily constructed and in view of the advantages arising from the attachment without the use of nails, the expense is comparatively but slightly increased.

Having thus described the invention, what is claimed as new is—

In a horseshoe, the combination of side and front sections pivotally connected to each other and having upwardly projecting and inwardly extending ears, the side sections also having inwardly extending arms which are hollow and oppositely screw-threaded, and a head having right and left screws engaging the said arms, substantially as and for the purpose specified.

In testimony whereof I have signed this specification in the presence of two subscribing witnesses.

ELMER HOGBIN.

Witnesses:
WINFIELD B. WHEATON,
JAMES M. CASSADY.